May 28, 1929.  F. W. REILLY  1,714,625
TRAMWAY FRICTION GRIP
Filed Dec. 19, 1927   3 Sheets-Sheet 1
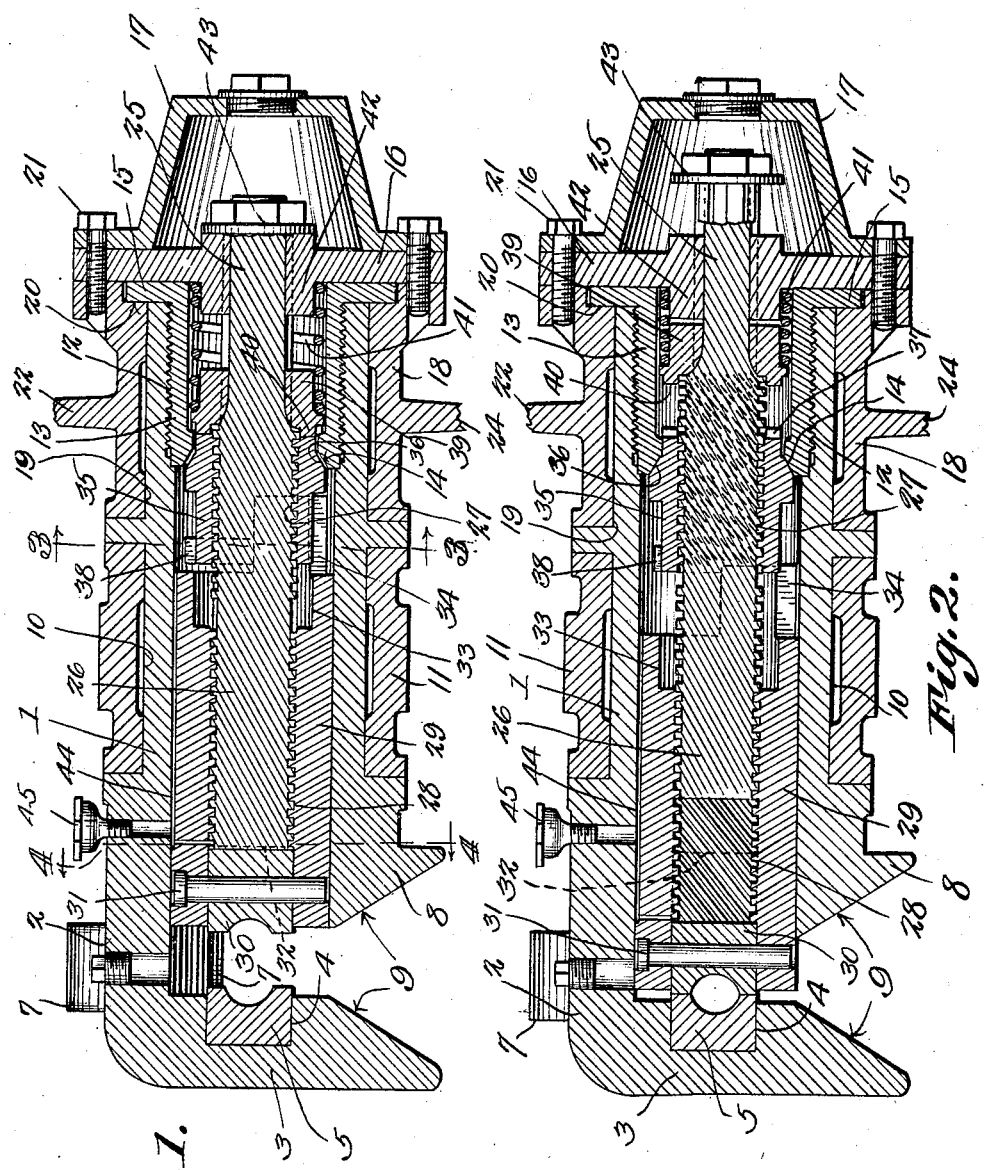
F. W. Reilly
Inventor
By C. A. Snow & Co.
Attorneys.

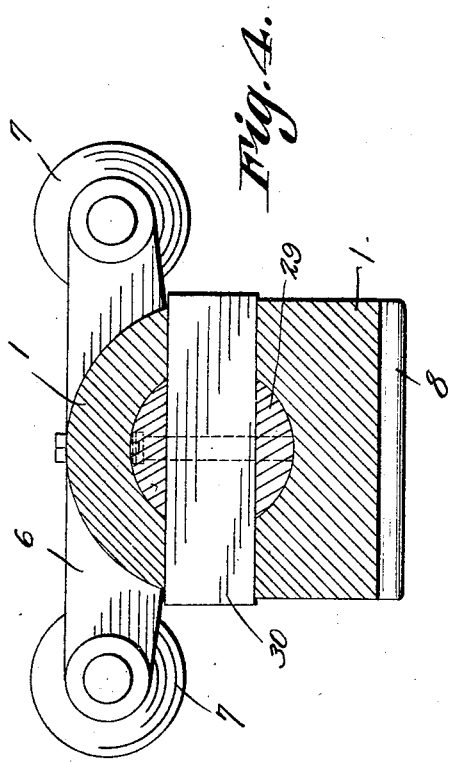
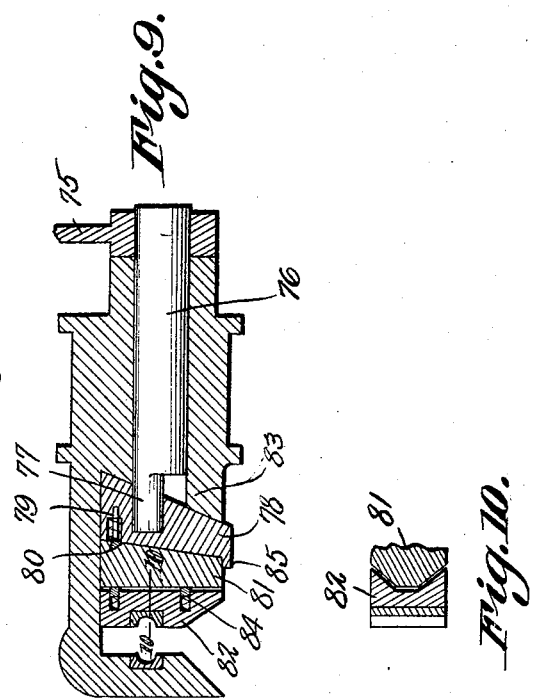
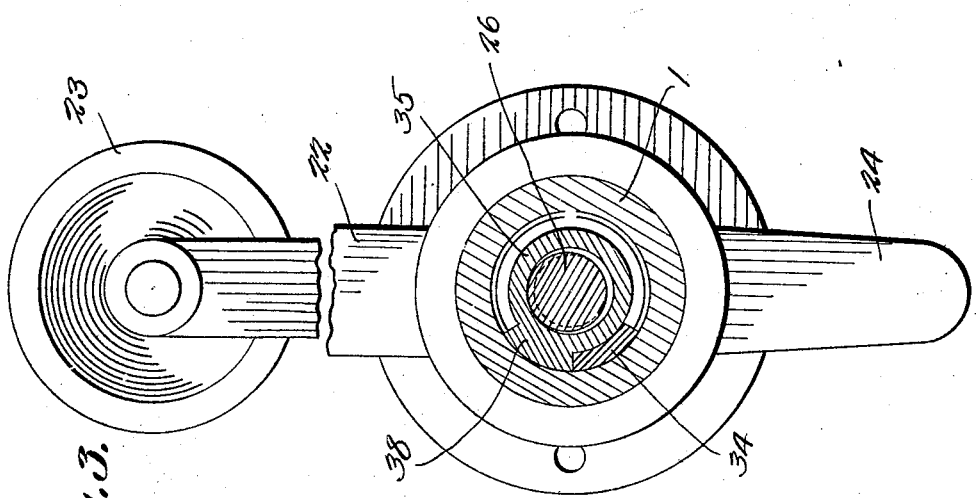

May 28, 1929.  F. W. REILLY  1,714,625
TRAMWAY FRICTION GRIP
Filed Dec. 19, 1927    3 Sheets-Sheet 3
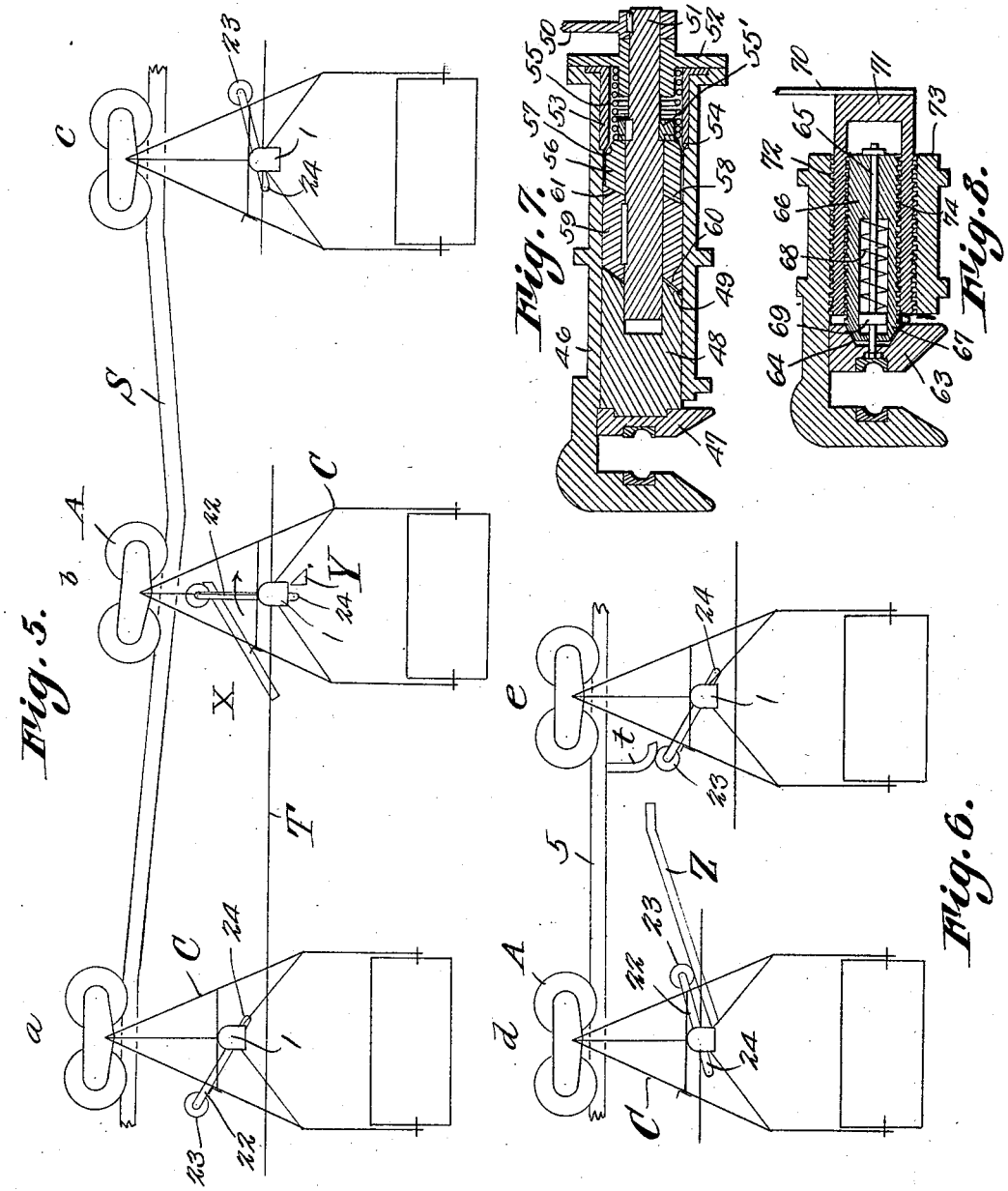

Patented May 28, 1929.

1,714,625

UNITED STATES PATENT OFFICE.

FRANK WARD REILLY, OF CHATTANOOGA, TENNESSEE.

TRAMWAY FRICTION GRIP.

Application filed December 19, 1927. Serial No. 241,161.

This invention relates to friction grips designed primarily for use in connection with aerial tramways for the purpose of coupling overhead carriers to and uncoupling them from the traction rope.

It is essential that a friction grip be so constructed as to tightly clamp a traction rope when the carrier reaches predetermined points and thereafter to become automatically released from the traction rope at desired points. This traction rope, however, is not always of the same diameter and it is essential, therefore, that the gripping means be so constructed as to properly grip the rope at any point presented thereto.

It is an object of the present invention to provide a friction grip having means whereby the traction rope will be clamped therein with the same efficiency whether the rope be thin or thick at the point where it is gripped, thus insuring proper coupling of the traction rope to the carrier.

A further object is to provide a friction grip which is simple and efficient in construction and which utilizes a differential mechanism, whereby, when the grip is thrown into action by suitable tripping means employed for that purpose, it will be operated with a fast closing action until it comes into contact with the traction rope at which time the gripping will take place at a slow speed but with increased power irrespective of the distance the grip jaws have closed during the gripping operation, the pressure upon the traction rope being predetermined within reasonably close limits at all times.

A further object is to provide a friction grip which is rotatably mounted whereby it can be revolved through one-hundred eighty degrees to allow the engagement and disengagement of the traction rope to take place should said rope be arranged to enter the grip from the top or from the bottom.

Another object is to provide a friction grip the bearing area of which is greater than ordinarily permissible, thereby reducing the unit bearing pressure on the working parts and prolonging the life of the apparatus.

A still further object is to provide a grip having a full floating lever for use in the application and disengagement of the trips relative to the traction line.

Another object is to provide a grip having its important working parts completely enclosed, thereby to protect them by retaining lubricant and excluding foreign matter.

Another object is to provide a grip so designed that the more important parts may be made of a high grade or alloy steel not ordinarily possible in connection with tramway grips.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred forms of the invention have been shown.

In said drawings,

Figure 1 is a central longitudinal section through the friction grip showing the jaws spaced to receive a traction line or cable therebetween.

Figure 2 is a similar view showing the jaws moved together for clamping upon a traction line.

Figure 3 is a section on line 3—3, Figure 1.

Figure 4 is a section on line 4—4, Figure 1.

Figure 5 is a view in diagram showing the successive positions of the cooperating parts during the attaching operation of the friction grip relative to the traction line.

Figure 6 is a similar view showing the relative positions of the parts while the friction grip is being detached from the traction line.

Figure 7 is a section through a modified form of friction grip.

Figure 8 is a section through another form thereof.

Figure 9 is a section through a third modification of the device.

Figure 10 is a section on line 10—10, Figure 9.

Referring to the figures by characters of reference 1 designates the tubular body of the device which can be made of a casting and has a projecting portion 2 at one end from which extends a fixed jaw 3. This fixed jaw 3 has a recess 4 in which is seated a gripping block 5 which can be held in place in any manner desired. Wings 6 are extended laterally from the body adjacent the jaw and carry wheels 7 adapted to engage and travel along the traction line. The free end of the body 1 is spaced from the free end of the fixed jaw 3 and has a lip 8 extending therefrom, this lip and the free end portion of the jaw 3 being provided with beveled faces which converge inwardly as shown at 9. The body is provided adjacent its center with an annular groove 10 designed to receive a split collar or the like whereby the body can be properly supported relative to the carrier structure C with which the friction grip is used. Any suitable means, not shown, can be employed for limiting the rotation of body 1 within this sleeve 11 although it is to be understood that the body can be rotated through 180° relative to the collar to permit the traction rope to enter from the top instead of from the bottom.

The body 1 is interiorly screw threaded at that end thereof remote from the jaw 3 as indicated at 12, this threaded portion being engaged by a threaded friction sleeve 13 having its inner end beveled to provide a friction surface 14 while its outer end has an annular flange 15 lapping the adjacent end of the body 1 and extending outwardly therebeyond. This flange is held in proper position relative to the body by a pin or any other suitable means. A driving disk 16 bears against flange 15 and on the outer face thereof is mounted a cap 17. A ring 18 is mounted for rotation on the reduced end portion 19 of the body 1, this ring being formed with a recess 20 into which the flange 15 projects. Bolts or other suitable fastening means 21 are employed for attaching the cap 17 to the disk 16 and for fastening said disk to the ring 18. Thus it will be seen that the ring, disk and the cap will all rotate together relative to the body 1. An arm 22 is extended from the ring 18 and carries a wheel 23 adapted to cooperate with suitable tripping mechanism hereinafter described. A finger 24 extends in the opposite direction from the ring 18 and is likewise designed for use in connection with certain tripping mechanism as will be explained hereinafter. The driving disk 16 has a shank 25 feathered therein at the center, this shank being provided at one end of a screw 26 extending longitudinally within the central portion of the body 1. That portion of the screw nearest the shank 25 has threads 27 which are pitched more finely than the threads 28 on the remaining portion of the screw. The coarse threads 28 engage an elongated tubular jaw nut 29 mounted to work within the body 1 and an elongated block 30 seated in and extending transversely of that end portion of the nut 29 nearest the jaw 3. This block is held to the nut 29 by a pin 31 extending within the nut and block as shown and the ends of the block 30 are adapted to slide within slots 32 formed in the sides of the body 1 at that end thereof nearest the jaw 3. Thus it will be seen that the block 30 serves not only to hold the nut 29 against rotation in the body 1 but also acts as a movable jaw for cooperation with the jaw 3 and the block 5 carried thereby.

The inner end of the tubular nut 29 is counterbored as indicated at 33 and extending from this counterbored end of the nut is an arcuate wing 34.

Mounted on the threaded portion 27 of the screw is a differential nut having a tapered clutch face 36 adapted to move into and out of engagement with the beveled clutch face 14 of the friction sleeve 13. One end of this differential nut is constantly located within the sleeve 13 and has clutch teeth 37 projecting therefrom. The other end of the differential nut is constantly lapped by the wing 34 and has a lug 38 extending partly therearound so as to limit the relative movement of the wing 34 and the lug 38.

A driving collar 39 is feathered on the stem 25 of screw 26 and has clutch teeth 40 projecting therefrom at points where they can be engaged by the teeth 37 when the screw 26 and its stem or shank 25 are moved longitudinally in one direction a predetermined distance. A coiled spring 41 is seated at one end on the hub 42 of the driving disk 16 and at its other end extends around and thrusts against the collar 39 thereby to hold said collar normally pressed against the end of the screw where it joins the shank 25.

As before explained this friction grip is adapted to be connected to a carrier by the ring or collar 11. The body 1 is extended transversely of the direction of travel of the carrier so that the inclined faces 9 leading to the space between the jaws will be so located that the traction rope T can readily be deflected into said space. In Figures 5 and 6 the carrier C has been shown supported by a carriage A mounted on the supporting rail S. Normally the floating lever 22 is at one extreme position as shown, for example, at *a* in Figure 5. With the lever thus located the parts of the friction grip are disposed as shown in Figure 1. At the point where the grip is designed to engage the traction rope, the rail S is depressed as shown at *b* in Figure 5 and there is arranged at this point an inclined tripping bar *x* and a tripping lug *y*. The bar *x* is so located that as the carrier travels down the inclined rail S the wheel 23 carried by the floating lever 22 will come against the bar *x* and travel upwardly therealong until it arrives at a point near the top of the bar at which time the finger 24 comes against the lug *y*, thereby causing the wheel 23 and floating lever 22 to be thrown in the direction indicated by the arrow in Figure 5. Consequently as the carrier passes the tripping element the floating lever will assume the position indicated at $c$ in Figure 5.

The movement of the floating lever above described results in the following operation:

Motion is transmitted from the ring 19 to the disk 16 and thence through shank 25 to the screw 26. The pressure of spring 41 against collar 39 and nut 35 holds the head 43 of the shank normally pressed against disk 16 as shown in Figure 1. Thus the differential nut 35 and the collar 39 will rotate with the screw 26 because there is nothing to retard such movement. During this movement of the screw the coarse threads 28 thereon will force the tubular nut 29 longitudinally within body 1 until the block 30 comes against the traction rope T and forces it against the block 5.

Referring to Figure 1, showing a sectional view of the grip with jaws in the extreme open positions, the clearance between the jaws can be assumed as $\frac{15}{16}$ of an inch. Therefore the travel of nut 29 and jaw 30 from position as shown in Figure 1 to position as shown in Figure 2 in relation to body casting 2 will be $\frac{15}{16}$ of an inch. The distance of travel of differential nut 35 from position as shown in Figure 1 to a position as shown in Figure 2 in relation to the body casting 1 will be assumed as $\frac{1}{16}$ of an inch. The angle of action of lever 22, Figure 5, from position "$a$" to position "$c$" will be assumed as 135°. In considering the movement of $\frac{15}{16}$ of an inch of movable jaw 30, as before stated, it will be assumed that the fast motion of the grip will cause a movement of $\frac{7}{8}$ of an inch and the slow motion a movement of the remaining $\frac{1}{16}$. In considering the fast motion of $\frac{7}{8}$ of an inch it will be assumed that lever 22, Figure 5, will have passed through an angle of 90°. Before the slow motion can become effective the clutch faces, 14 and 36, must be engaged and as before stated, differential nut 35 has a lateral movement of $\frac{1}{16}$ of an inch from normal position to engagement. Therefore, when movable jaw 30 has traveled $\frac{7}{8}$ of an inch in relation to the body casting 1, and at the point of engagement of the slow motion, screw 26 has traveled $\frac{15}{16}$ of an inch in relation to nut 29. As this must take place in the angle of movement of 90° it is evident that the pitch of threads 28 must be four times this relative movement of $\frac{15}{16}$ of an inch or $3\frac{3}{4}$ inch pitch. Assuming that clutch faces 14 and 36 are now engaged and the relative rotation between nut 35 and body casting 1 stopped, further angular movement of screw 26 will cause it to move backwardly through nut 35. To obtain the slow motion to complete the closing of the jaws the remaining $\frac{1}{16}$ of an inch, screw 26 must necessarily back off through nut 35 at such a rate that through an angular movement of the remaining 45° the relative movement between screw 26 and nut 35 will be $\frac{1}{16}$ of an inch less than the relative movement between nut 29 and screw 26. As the lead of threads 28 are $3\frac{3}{4}$ inch a movement of 45° or $\frac{1}{8}$ revolution will cause a relative movement between nut 29 and screw 26 of $\frac{15}{32}$ of an inch. The relative movement between nut 35 and screw 26 must be $\frac{1}{16}$ of an inch less. Therefore this movement would be $\frac{13}{32}$ of an inch. As this represents the movement in $\frac{1}{8}$ of a revolution, a total movement per revolution or in other words the pitch of threads 27 would be eight times $\frac{13}{32}$ of an inch or $3\frac{1}{4}$-inch pitch. Thus the slow motion, or the differential motion as it may be called, of the grip takes place.

The purpose of the clutch teeth 40 and 37 is to insure the rotation of the differential nut 35 with screw 26 until the clutch faces 14 and 36 have become sufficiently engaged to cause the pressure between the teeth to slightly depress spring 41, thus disengaging their contact. In the off position of the grip, as shown in Figure 1, wing 34 has become engaged with lug 38, preventing further relative rotation. Teeth 37 and 40 also are engaged. On account of their design and the advancement of the thread through the nut when further rotation of the lever in this direction is attempted, they become self locking and prevent this rotation of screw 26 which is of course, connected to lever 22 through plate 16. This assures all working parts being properly returned to their initial position when the grip is completely disengaged. Spring 41 also serves the purpose of maintaining clearance between clutch faces 14 and 36.

It will be obvious that this mechanism, operating as described, gives a high mechanical advantage and a firm gripping action on the traction rope, this being regardless of any variations in the diameter of the rope. Consequently by having the mechanism described small adjustments heretofore necessary in friction grips are eliminated and it does not become necessary to predetermine the angle of action of the lever within comparatively close limitations.

It will be noted that all of the important working parts of this grip are enclosed within the body. Thus it is possible to thoroughly lubricate them and to protect them from wear due to the admission of foreign matter. The cap 17 can be used as a lubricant container and passages, such as the one indicated for example at 44 can be used in connection with a breather 45 to allow free movement of the air in the body 1 without causing displacement of the lubricant on the bearing surfaces.

It will be apparent that the gripping members 5 and 30 can be renewed should they become worn or otherwise rendered unfit for further use.

The method of shifting the floating lever for the purpose of applying the grip to the traction line has already been explained. This means, illustrated in Figure 5, can of course be varied. One mechanism employed for returning their parts to their initial positions and thereby disengaging the grip from the traction line, has been illustrated in Figure 6. This means includes a lifting rail *z* in the path of the roller or wheel 23. This is located where the carrier is to be disconnected from the traction line. Adjacent the upper end of the rail *z* but spaced therefrom is a tripping finger *t*. Thus when the carrier arrives at the point where it is to be released from the traction line the wheel 23 will ride upwardly along the bar or rail *z* until the lever 22 assumes a substantially vertical position. Wheel 23 then comes against the finger *t* so that lever 22 is thrown backwardly past the dead center and is restored to the initial position. The first of the releasing positions has been illustrated at *d* in Figure 6 while the last of the releasing positions has been indicated at *e*. This last position corresponds with position *a* in Figure 5. Obviously when the floating lever is returned to its initial position by the mechanism shown in Figure 6 or by any other mechanism provided for that purpose, the operation of the parts of the friction grip will be reversed so that the gripping member 30 will be moved away from the gripping member 5. During this movement the arcuate wing 34 will come against the lug 38 (see Figure 3) and insure the positive return of all the working parts to their initial positions when the grip is completely restored to releasing position.

The mechanism of the friction grip thus far described constitutes the preferred construction. It is to be understood, however, that different variations of the mechanism disclosed may be made without departing from the spirit of the invention. For example, and as shown in Figure 7, the tubular body 46 of the friction grip can be provided with a movable jaw 47 fixed to and carried by a slide 48 the inner end of which is beveled or otherwise shaped to provide a quick cam 49. The lever 50 is connected to a shank 51 mounted to slide and rotate within a head 52 connected to one end of the body 46. A friction sleeve 53 is mounted in the body and has a tapered clutch face 54. A spring 55 engaging the head 52 thrusts against collar 55′ and a differential member 56. The collar 55′ is similar to collar 39. Member 56 has a tapered clutch face 57 which is held normally spaced from the clutch face 54 by the action of the spring 55. The member 56 also has a cam face 58 and interposed between this cam face and the cam face 49 is a sleeve 59 provided at one end with a cam 60 corresponding with the cam 49 and at its other end with a cam 61 corresponding with the cam 58. This sleeve 59 is keyed to the shank 51. Thus it will be seen that when the lever 50 is swung relative to the body 46, shank 51 will be rotated and during the first portion of this movement the member 56 will rotate therewith because it is unrestrained. The cam face 60, however, which is of faster action than cam face 58, will thrust against the cam face 49 and thrust the slide 48 quickly in one direction until the jaw 47 clamps against the traction line. As soon as the slide is thus retarded against further movement the cam face 61 will thrust against the cam face 58 and force the member 56 into frictional engagement with the sleeve 53, causing clutch teeth between collar 55′ and member 56 to become disengaged.

At this time the cam faces 58 and 61 will be brought into action resulting in the slow forward feeding of the jaw 47 substantially in the same manner as explained with reference to the structure illustrated in Figures 1 to 3 inclusive.

Another modified arrangement whereby similar results can be obtained has been illustrated in Figure 8. In this form of device the sliding jaw 63 has a tapered recess 64 and extending from the jaw and beyond the recess is a rod 65. A sleeve 66 is mounted for limited sliding movement on the rod and has a tapered clutch member 67 normally located within but spaced from the wall of the recess 64. A spring 68 is seated within the sleeve 66 and constantly thrusts against a collar 69 on the rod 65. This spring thus serves to hold the clutch member 67 normally spaced from the wall of the recess 64. The lever 70 is connected to one end of a tubular member 71 which is provided with a coarse pitched screw thread 72 on its outer surface engaging corresponding threads in the inner surface of the body 73. Formed within the tubular member 71 and on the outer surface sleeve 66 are cooperating threads 74. The screw threads 72 and 74 are right hand and left hand threads respectively and are of different pitches. Thus, when member 71 is fed forwardly and sleeve 66 is held against rotation, the forward feeding action by the threads 72 will be almost counteracted with the result that sleeve 66 will advance only at a very slow speed. Thus it will be seen that when the lever 70 is shifted by the tripping mechanism the member 71 will feed quickly in one direction until the jaw 63 comes against the traction line. As soon as this jaw is stopped by contact with the traction line the resistance of spring 68 will be overcome and the friction clutch member 67 will come against the wall of the recess 64, thereby coupling the sleeve 66 to the jaw and holding the sleeve against rotation. Consequently the threads 74 will come into play and even though the member 71 is still feeding forwardly, the advance of the sleeve 66 and jaw 63 will be very slow. As a result of this action the traction rope will be firmly gripped following the rapid application of the jaws to the rope.

In Figure 9 a further modified arrangement of the mechanism has been illustrated. In this figure the lever 75 is fastened securely to the shaft 76 which is provided at one end with an extension pin 77 operating as a crank to impart an up and down movement to a wedge block 78. A spring pressed sliding pawl 79 is carried by this wedge and projects into a recess 80 within an intermediate wedge block 81. Upon application of the friction grip the wedge block 81 is carried downwardly with the wedge block 78 until the frictional engagement between the jaw 82 and the block 81 becomes sufficient to cause the disengagement of the pin 80. At this point the wedge block 81 is held spaced therein relative to jaw 82 and a slow motion is then obtained by the block 78 continuing downward between the surfaces of the block 81 and the body casting 83. Spring pressed pins 84 arranged in the jaw 82 are used to maintain clearance between said jaw and the block 81 as shown particularly in Figure 10 wherein the cooperating faces of these parts are indicated as being substantially V-shaped. This clearance will be maintained until the jaws come into contact with the rope at a predetermined pressure. The projection 85 at the bottom of the wedge block 78 is for the purpose of returning the working parts to their initial positions when the grip is thrown off.

What is claimed is:

1. A friction grip for aerial tramways and the like including fixed and movable jaws, a lever for actuation by tripping means in the path thereof, quickly operable means actuated by the lever during a portion of the movement thereof for shifting the movable jaw to bind a traction line or the like against the fixed jaw, means for feeding the movable jaw at a slow speed, and means controlled by the pressure of the movable jaw against the gripped line for coupling said slow feeding means to the lever to feed the movable jaw at a slow speed to further grip the line during the completion of the movement of the lever.

2. A friction grip for aerial tramways and the like including a tubular body having a fixed jaw, said body being adjustable angularly about its longitudinal axis, a movable jaw carried by the body, a lever connected to the body for actuation by a trip in the path thereof, quickly operable means for transmitting motion from the lever to the movable jaw during a portion of the movement of the lever thereby to grip an object between the jaws, slow speed feeding means, and means controlled by contact of the movable jaw with the gripped object for coupling the slow speed feeding means to the lever to actuate the movable jaw at a reduced speed and gradually increase the clamping upon the gripped object during the completion of the movement of the lever.

3. The combination with a tubular body mounted for adjustment about its longitudinal axis, and a fixed jaw carried by said body, of a movable jaw within the body, a lever adapted to be actuated by an obstruction in the path thereof, said lever being rotatable relative to the body, yieldingly pressed means for actuation by the lever during a portion of the movement thereof for quickly applying the movable jaw to an object to grip the same against the fixed jaw, and means controlled by the retardation of the movable jaw and continued rotation of the lever, for continuing the movement of the movable jaw at a reduced speed to further grip the engaged object between the jaws.

4. A friction grip of the class described including a tubular body having a fixed jaw at one end, a movable jaw carried by the body, a lever rotatable relative to the body, an elongated nut extending from the movable jaw, a screw having coarsely pitched threads engaging the nut, a differential nut mounted on the screw, said screw having finer pitched threads for engagement with the differential nut, a stationary friction clutch member within the body, said differential nut having a friction surface for engagement therewith, yielding means for holding the friction clutch member and nut normally separated, and a feathered connection between the screw and the floating lever.

5. A friction grip of the class described including a tubular body having a fixed jaw at one end, a movable jaw carried by the body, a floating lever rotatable on the body, an elongated nut extending from the movable jaw, a screw having coarsely pitched threads engaging the nut, a differential nut mounted on the screw, said screw having finer pitched threads for engagement with the differential nut, a stationary friction clutch member within the body, said differential nut having a friction surface for engagement therewith, yielding means for holding the friction clutch member and nut normally separated, a feathered connection between the screw and the floating lever, and cooperating means upon the elongated nut and the differential nut for limiting their relative rotation in one direction.

6. A friction grip of the class described including a tubular body having a fixed jaw at one end, a movable jaw carried by the body, a floating lever rotatable on the body, an elongated nut extending from the movable jaw, a screw having coarsely pitched threads engaging the nut, a differential nut mounted on the screw, said screw having finer pitched threads for engagement with the differential nut, a stationary friction clutch member within the body, said differential nut having a friction surface for engagement therewith, yielding means for holding the friction clutch member and nut normally separated, a feathered connection between the screw and the floating lever, and cooperating means upon the elongated nut and the differential nut for limiting their relative rotation in one direction, said means including an arcuate wing extending from the elongated nut, and an arcuate lug upon the differential nut in the path of the wing.

7. A friction grip including a tubular body, a fixed jaw at one end thereof, a floating lever mounted for rotation on the body, a driving disk connected to the lever and constituting a closure for one end of the body, a movable jaw slidable within the body and cooperating with the fixed jaw, means having a feathered connection with the driving disk for moving the movable jaw at a high speed to grip an object against the fixed jaw during a portion of the movement of the floating lever, a spring for holding said feathered connection yieldingly pressed in one direction during the advancement of the movable jaw to gripping position, slow speed feeding means within the body, and means actuated by retardation of the movement of the movable jaw for overcoming the action of the spring and coupling said slow speed feeding means to the driving disk during the completion of the movement of the floating lever, thereby to continue movement of the movable jaw at a greatly reduced speed to increase its grip upon the object between the jaws.

8. A friction grip including a tubular body having a fixed jaw at one end, a floating lever mounted for rotation on the body for actuation by an obstruction in the path thereof, a movable jaw including an elongated block, there being slots in the body for sliding engagement by the block, a screw rotatable in the body having threads of a coarse pitch and threads of a finer pitch, a feathered connection between the floating lever and the screw, means operated by the coarsely pitched threads for shifting the movable jaw toward gripping position at a high speed during a part of the movement of the floating lever, a differential nut in engagement with the finer pitched threads, yielding means for holding said nut in inactive position during the rapid feeding of the movable jaw, a clutch member within the body, said differential nut being shiftable against said clutch member by retardation of the feeding movement of the movable jaw on contact with an object in the path thereof, thereby to hold the differential nut against rotation and feed the movable jaw at a greatly reduced speed during the completion of the movement of the floating lever.

9. A friction grip for aerial tramways and the like including a tubular body having a fixed jaw, said body being adjustable angularly about its longitudinal axis, a movable jaw carried by the body, a lever connected to the body for actuation by a trip in the path thereof, quickly operable means for transmitting motion from the lever to the movable jaw during a portion of the movement of the lever thereby to grip an object between the jaws, slow speed feeding means, and means controlled by contact of the movable jaw with the gripped object for coupling the slow speed feeding means to the lever to actuate the movable jaw at a reduced speed and gradually increase the clamping upon the gripped object during the completion of the movement of the lever, and means for permitting free flow of air into and out of the body during the actuation of the jaw.

10. A friction grip for tramways and the like including a fixed jaw, a movable jaw, a lever, means actuated by the lever for imparting a quick movement to the movable jaw relative to the fixed jaw, and means controlled by the contact of the movable jaw with an object between the jaws for reducing the speed of the movable jaw but increasing the power transmitted thereto from the lever.

In testimony that I claim the foregoing as my own, I have hereto affixed my signature.

FRANK WARD REILLY.